United States Patent
Rothe et al.

(10) Patent No.: US 11,604,152 B2
(45) Date of Patent: Mar. 14, 2023

(54) FAST INDUSTRIAL COMPUTED TOMOGRAPHY FOR LARGE OBJECTS

(71) Applicant: Baker Hughes Oilfield Operations LLC, Houston, TX (US)

(72) Inventors: Nils Rothe, Hürth (DE); Andreas Fischer, Wunstorf (DE)

(73) Assignee: Baker Hughes Oilfield Operations LLC, Houston, TX (US)

( * ) Notice: Subject to any disclaimer, the term of this patent is extended or adjusted under 35 U.S.C. 154(b) by 149 days.

(21) Appl. No.: 17/036,858

(22) Filed: Sep. 29, 2020

(65) Prior Publication Data

US 2021/0109039 A1  Apr. 15, 2021

Related U.S. Application Data

(60) Provisional application No. 62/912,698, filed on Oct. 9, 2019.

(51) Int. Cl.
*G01N 23/046* (2018.01)
*G06T 7/00* (2017.01)
*G06T 15/08* (2011.01)

(52) U.S. Cl.
CPC ......... *G01N 23/046* (2013.01); *G06T 7/0002* (2013.01); *G06T 15/08* (2013.01); *G06T 2207/10072* (2013.01)

(58) Field of Classification Search
CPC ........... G06T 15/08; G06T 7/0002; G06T 2207/10072; G06T 11/006; G06T 2211/436; G01N 23/046; G01N 2223/3306; G01N 23/083; G01N 2223/643; G01N 2223/618; G01N 2223/419; G01N 2223/309; G01N 2223/3308; G01N 2223/652; G01N 2223/3307; G01N 23/041; G01N 23/20075; G01N 23/087; G01N 23/2076; G01N 23/223; G01N 23/18; G01N 23/04; G01N 2223/1016; G01N 21/6428;
(Continued)

(56) References Cited

U.S. PATENT DOCUMENTS 5,023,895 A * 6/1991 McCroskey ......... G01N 23/046
378/177
5,119,408 A * 6/1992 Little ................... G01N 23/046
378/10
(Continued)

*Primary Examiner* — Irakli Kiknadze
(74) *Attorney, Agent, or Firm* — Mintz Levin Cohn Ferris Glovsky and Popeo, PC

(57) ABSTRACT

A system for computed tomography inspection can include a stage, a stationary radiation source, a stationary radiation detector, and a controller. The stage can secure a target thereon and rotate about a rotation axis. The radiation source can emit a beam of penetrating radiation from a focal point that is directed upon a portion of the target. The radiation detector can include a sensing face configured to acquire measurements of radiation beam intensity incident thereon as a function of position. The controller can command the stage to translate from a first position to a second position in a direction transverse to a central axis of the radiation beam. A magnification of the target at the first and second positions can be approximately equal. The stage does not translate transverse to the central axis of the radiation beam during measurement of the radiation beam intensity by the detector.

18 Claims, 13 Drawing Sheets

(58) Field of Classification Search
CPC ........... G01N 21/4795; G01N 21/0303; G01N 15/147; G01N 15/14; G01N 21/6456; G01N 2021/052; G01N 21/05; G01N 2021/1772; G01N 2021/0307; G01N 2021/0392; G01N 2021/1787; G01N 2021/5919; G01N 2021/5923; G01N 2021/5957; G01N 2201/0696; G01N 2223/639; G01V 5/005; G01V 5/0008; B65G 54/02; H01J 35/08; H01J 35/12; H01J 35/18; H01J 35/14; H01J 35/112; A61B 6/484; A61B 6/4007; A61B 6/508; A61B 6/4291; A61B 6/035; A61B 6/40; A61B 6/502; A61B 6/032; A61B 6/4035; A61B 6/06; A61B 6/488; A61B 6/5282; A61B 6/542; A61B 6/588; A61B 6/469; A61B 6/54; A61B 6/0407; A61B 6/037; A61B 6/541; A61B 6/547; A61B 6/52; A61B 6/5205; A61B 6/4085; A61B 6/027; A61B 6/5258; A61B 6/466; A61B 6/4488; A61B 6/4233; A61B 6/4258; A61B 6/4021; A61B 6/04; A61B 6/0487; A61B 6/583; A61B 6/4405; A61B 6/482; A61B 6/4458; G21K 1/025; G21K 1/02; G21K 1/067; G21K 1/06; G21K 1/08; G21K 5/04; G01T 1/2978; G01T 1/2985; G01T 1/246; G01T 1/1615; G01T 1/29; A61N 5/1081; A61N 5/1067; A61N 5/1037; A61N 5/1069; A61N 5/1049; A61N 5/1082; A61N 5/1039; A61N 5/1077; A61N 2005/1061; A61N 5/1038; A61N 5/1065; G01B 15/00; G01B 21/045; G01B 15/025

USPC .......................................... 378/4, 19, 62, 65

See application file for complete search history.

(56) References Cited

U.S. PATENT DOCUMENTS

| | | | | |
|---|---|---|---|---|
| 5,848,115 | A | * | 12/1998 | Little ...................... G06T 17/00 382/152 |
| 2012/0155606 | A1 | * | 6/2012 | Simon ............... C04B 35/63436 378/19 |
| 2017/0309063 | A1 | * | 10/2017 | Wang ................. G01N 29/2418 |
| 2021/0048397 | A1 | * | 2/2021 | Neuser ................ G01N 23/046 |

* cited by examiner

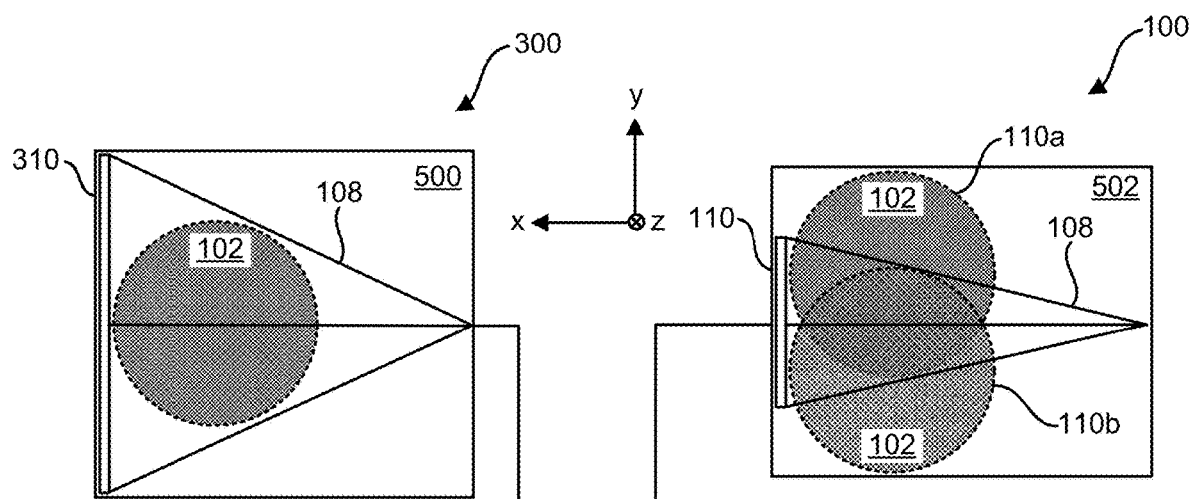
FIG. 5A
FIG. 5B
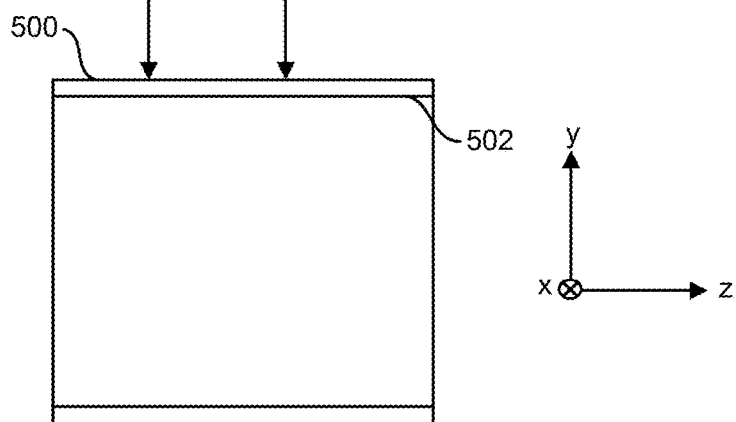
FIG. 5C

FAST INDUSTRIAL COMPUTED TOMOGRAPHY FOR LARGE OBJECTS

CROSS-REFERENCE TO RELATED APPLICATIONS

This application claims the benefit of U.S. Provisional Patent Application No. 62/912,698, filed on Oct. 9, 2019, and titled "Fast Industrial Computed Tomography For Large Objects," the entirety of which is incorporated by reference.

BACKGROUND

Non-destructive testing (NDT) is a class of analytical techniques that can be used to inspect a target, without causing damage, to determine whether the inspected target meets required specifications. NDT has found wide acceptance in industries such as aerospace, power generation, oil and gas transport or refining, and transportation that employ structures that are not easily removed from their surroundings.

Computed Tomography (CT) is one example of an NDT technique. In certain implementations, CT can provide quantitative images of material density as a function of geometry of cross-sections through the target. These cross-sectional images can be combined to produce corresponding 3-dimensional (volume) representations of the target.

However, existing CT systems can acquire CT images that include artifacts. Artifacts can refer to any discrepancy between the CT image and what is expected based upon the density of the target material and the target geometry. Accordingly, there is a continued need for improved systems and corresponding methods for CT inspection that reduce the occurrence of artifacts in CT images.

SUMMARY

In an embodiment, a system is provided. The system can include a stage, a stationary radiation source, a stationary radiation detector, and a controller. The stage can be configured to secure a target thereon and to rotate the target about a rotation axis. The stationary radiation source can be configured to emit a beam of penetrating radiation from a focal point and directed upon a portion of the target. The stationary radiation detector can include a sensing face configured to acquire measurements of an intensity of the radiation beam incident thereon as a function of position. The controller can be configured to command the stage to translate the target between a first position and a second position in a direction transverse to a central axis of the radiation beam. A magnification of the target at the first and second positions can be approximately equal. The stage does not translate transverse to the central axis of the radiation beam during measurement of the radiation beam intensity by the detector.

In another embodiment, the rotation axis can be positioned within the radiation beam at the first and second positions.

In another embodiment, the first and second positions can be approximately symmetric about the central axis of the radiation beam.

In another embodiment, the stage can be configured to translate the target to a third position located between the first and second positions. The magnification of the target in the first, second, and third positions can be approximately equal.

In another embodiment, the rotation axis can approximately intersect the central axis of the radiation beam in the third position.

In another embodiment, the position of the rotation axis in the third position can be approximately equidistant between the position of the rotation axis in the first position and the position of the rotation axis in the second position.

In another embodiment, the radiation beam is a fan beam or a cone beam.

In another embodiment, the radiation beam is not a parallel beam.

In another embodiment, a method is provided. The method can include positioning a stage having a target mounted thereto at a first position. The method can further include emitting, from a focal point of a stationary radiation source, a beam of penetrating radiation. The radiation beam can extend from the focal point, through a portion of a target, and be incident upon a sensing face of a stationary radiation detector. The method can also include rotating the stage at the first position about a rotation axis during emission of the radiation beam. The method can additionally include measuring, by the stationary detector, intensity of the radiation beam incident thereon as a function of position during rotation of the stage at the first position. The method can also include ceasing measurement of the intensity of the radiation beam. The method can further include translating the stage from the first position to a second position along a translation path transverse to a central axis of the radiation beam. The method can additionally include rotating the stage at the second position about the rotation axis during emission of the radiation beam. The method can also include measuring, by the detector, intensity of the radiation beam incident thereon as a function of position during rotation of the stage in the second position. The method can further include outputting, by the radiation detector, respective signals including data characterizing the intensity of the radiation beam measured at the first and second positions.

In another embodiment, the rotation axis can be positioned within the radiation beam at the first and second positions.

In another embodiment, the first and second positions can be approximately symmetric about the central axis of the radiation beam.

In another embodiment, the method can further include translating, by the stage, the target to a third position located between the first and second positions. The magnification of the target in the first, second, and third positions can be approximately equal.

In another embodiment, the rotation axis can approximately intersect the central axis of the radiation beam in the third position.

In another embodiment, the position of the rotation axis in the third position can be approximately equidistant between the position of the rotation axis in the first position and the position of the rotation axis in the second position.

In another embodiment, the stage is not translated during emission of the first or second radiation beam.

In another embodiment, the radiation beam can be a fan beam or a cone beam.

In another embodiment, the method further includes calibrating the stage prior to measurement of the intensity of the radiation beam.

In another embodiment, the calibration can determine the location of the rotation axis with respect to the radiation detector and the stationary radiation source.

In another embodiment, the method further includes measuring at least one dimension of the target based upon the data characterizing the intensity of the radiation beam measured at the first and second positions.

In another embodiment, the dimensional measurement can be acquired from a volume image reconstructed from the data characterizing the intensity of the radiation beam measured at the first and second positions.

DESCRIPTION OF DRAWINGS

These and other features will be more readily understood from the following detailed description taken in conjunction with the accompanying drawings, in which:

FIG. 5A is a diagram illustrating a footprint of the CT system of FIG. 3A with a target of maximum size;

FIG. 5B is a diagram illustrating a footprint of the CT system of FIG. 1A with a target of maximum size;

FIG. 5C is a diagram illustrating a comparison of the footprints of FIGS. 5A and 5B.

FIG. 8B is a magnified view of the CT volume image of FIG. 8A;

FIG. 8D is a magnified view of the CT volume image of FIG. 8C;

FIG. 8F is a magnified view of the CT volume image of FIG. 8E; and

It is noted that the drawings are not necessarily to scale. The drawings are intended to depict only typical aspects of the subject matter disclosed herein, and therefore should not be considered as limiting the scope of the disclosure.

DETAILED DESCRIPTION

Computed Tomography (CT) is one example of a non-destructive testing technique that can provide quantitative images of material density through a slice or cross-sections of a target object using radiation beams such as X-rays. These images (e.g., cross-sections) can be combined to produce corresponding three-dimensional representations of the target. However, existing techniques for performing CT can produce images including artifacts, erroneous features that appear in CT images but are not part of the target. Accordingly, improved systems and methods are provided for CT inspection that reduce the occurrence of artifacts in CT images. In an embodiment, the CT system is configured to position a target at two or more locations with respect to a radiation beam and detector and to acquire CT images of the target at each location. The two or more positions are spaced apart from each other (e.g., offset from a central axis of the radiation beam). When three or more positions are employed, one of the positions could be aligned with the central axis, while other positions are offset from the central axis. The magnification of the target (e.g., the distance of the target from the detector) at the two or more positions can be approximately equal. As an example, the two or more positions can be offset at approximately 90 degrees from the central axis of the radiation beam. CT images acquired at the two or more locations can be reconstructed to yield CT volume images with fewer artifacts as compared to CT systems that acquire CT images at a single position.

Embodiments of sensing systems and corresponding methods for non-destructive inspection of targets, such as industrial components, by computed tomography are discussed herein. However, embodiments of the disclosure can be employed for imaging any target objects by computed tomography without limit. As an example, targets having various compositions and geometries (e.g., shape, size, etc.) can be employed and imaged at one or more desired magnifications.

Figure 1A:
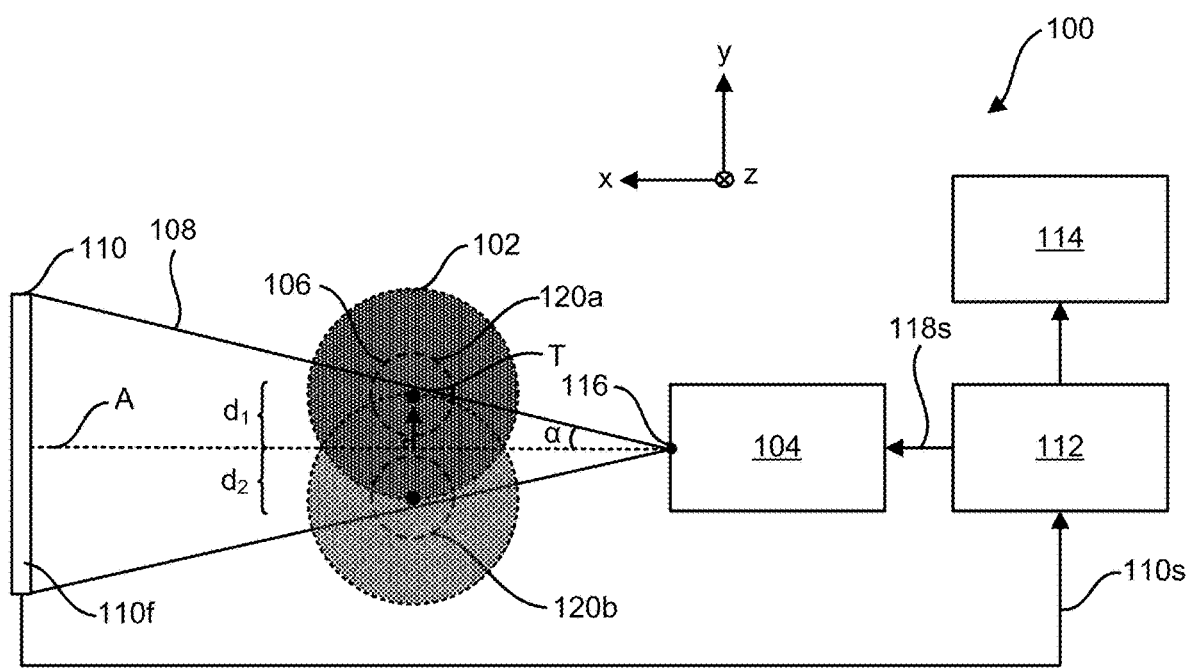
FIG. 1A is a diagram illustrating one exemplary embodiment of an operating environment including a computed tomography (CT) system configured to perform an offset scan at two positions.
Figure 1B:
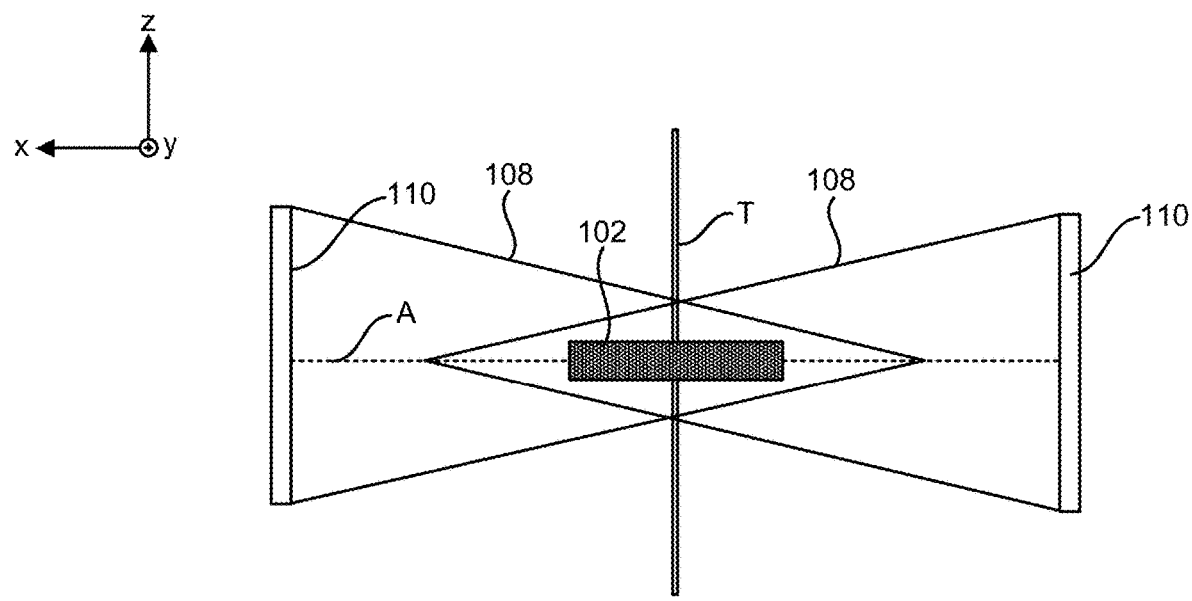
FIG. 1B is a diagram illustrating a side view of the operating environment of FIG. 1A including the target rotated by 180°.

FIG. 1A illustrates one exemplary embodiment of an operating environment including a computed tomography (CT) system 100 configured to perform non-destructive testing of a target 102. The CT system 100 can include a radiation source 104, a stage 106, a radiation detector 110, a controller 112, and an output device 114. One or more electrical power sources (not shown) can be configured to provide electrical power to the CT system 100. The stage 106 can be positioned between the radiation source 104 and the detector 110 and it can be configured to secure the target 102 thereon and to rotate the target 102 about a rotation axis T. The radiation source 104 can be configured to emit a radiation beam 108 (e.g., penetrating radiation) from a focal point 116 and to direct the radiation beam 108 incident upon the target 102 for imaging of the target 102. The detector 110 can include a sensing face 110$f$ configured to detect the portion radiation beam 108 that is incident thereon after transmission through the target 102. The projection of the radiation beam 108 incident upon the sensing face 110$f$ of the detector 110 (e.g., intensity of the radiation beam 108 as a function of position) can be referred to herein as a CT image.

In use, the radiation source 104 can be configured to emit the radiation beam 108 in a predetermined geometry (e.g., two- or three-dimensional geometries) from the focal point 116 in response to command signals 118$s$ received from the controller 112. As discussed in detail below, the target 102 can be positioned at two or more positions that are transversely offset with respect to a central axis A of the radiation beam 108. At each position, the target 102 can be rotated about its rotation axis T and the intensity of the radiation beam 108 can be detected at the detector 108. That is, a CT image can be acquired at each position. The CT images can be used to reconstruct CT volume images representing different cross-sections cross-section of the target 102.

In general, CT volume images can contain artifacts, false features that are not representative of the target 102. As an example, artifacts can manifest themselves as light or dark streaks or shadows. The presence of artifacts can be undesirable, as they can frustrate use of CT volume images for quantitative analysis (e.g., feature dimensions, component volume fractions, etc.). As discussed in greater detail below, by acquiring CT images at the two or more positions, CT volume images reconstructed from these CT images can exhibit fewer artifacts as compared to existing CT systems. The system 100 is discussed in further detail below with regards to FIGS. 1A-1D.

Embodiments of the target 102 can be any structure and/or material that is suitable for inspection using the radiation beam 108. As an example, the target 102 can allow transmission of the radiation beam 108 with sufficient radiant intensity (electromagnetic energy per unit time per unit solid beam angle) for detection by the detector 110. Examples of target structures can include castings, vehicle parts (e.g., automobiles, aircraft, watercraft, etc.). Examples of materials forming the target 102 can include metals, metal alloys, ceramics, polymers, stone, and composites thereof. While the target 102 is illustrated herein as possessing a circular cross-section (e.g., perpendicular to the rotation axis T), it can be understood that embodiments of the target can possess any desired cross-sectional area.

Embodiments of the radiation source 104 can be any device capable of generating and directing a beam of penetrating radiation (e.g., radiation beam 108) through the target 102. Examples of the penetrating radiation can possess energy up to about 15 MeV (e.g., about 100 eV to about 15 MeV. In certain embodiments, the radiation beam 108 can possess a two-dimensional or three-dimensional geometry. In other embodiments, the radiation beam 108 is not collimated. That is, rays of the radiation beam 108 can be divergent with respect to emission from the focal point 116 and are not parallel beams. Examples of two-dimensional geometries can include fan beams. Examples of three-dimensional geometries can include conic geometries (e.g., right cones, oblique cones, and combinations thereof). In either case, as illustrated in FIG. 1A, the radiation beam 108 can be a diverging beam that extends from the focal point 116 to the detector 110 having a beam half-angle $\alpha$ with respect to the central axis A.

The stage 106 can be configured to secure the target 102 thereto via a securing mechanism (not shown). The securing mechanism can be integrated within the stage 106 and/or deployed in combination with the stage 106. Examples of the securing mechanism can include adhesives, clamps, straps, threaded components (e.g., screws, bolts), and the like. The stage 106 can be in further configured to translation (e.g., in one or two directions) for placement of the target at a predetermined position with respect to the central axis A of the radiation beam 108. The stage 106 can also be configured to rotate about the rotation axis T in order to place the target 102 at a desired rotation angle with respect to the detector 110.

The radiation detector 110 can be configured to detect flux density, also referred to as intensity, of penetrating radiation incident upon its sensing face 110$f$ as a function of position. Examples of the radiation detector 110 can include gas ionization detectors, scintillation counter detectors, photostimulatable phosphor plates, photographic plates, semiconductor detectors (e.g., charge coupled devices or CCD), and the like. In certain embodiments, the sensing face 110$f$ can adopt a predetermined geometry. As shown in FIG. 1A, the radiation detector 110 can include a sensing face 110$f$ that is approximately planar. The radiation detector 110 can also be configured to output one or more detection signals 110$s$ including data representing a CT image (e.g., measured intensity of the radiation beam 108 incident upon the sensing face 110$f$ as a function of position).

In certain embodiments, the controller 112 can be in communication with the radiation source 104 for control of characteristics of the radiation beam 108 (e.g., frequency, amplitude, intensity, geometry etc.). The controller 112 can be further in communication with the stage 106 for control of movement (e.g., translation and rotation) of the stage 106. The controller 112 can be any computing device employing a general purpose or application specific processor. The controller 112 can also include a memory (not shown) for storing instructions related to control of the radiation beam 108 and movement of the stage 106.

In certain embodiments, the radiation source 104 and the detector 110 can be stationary. That is, the radiation source 104 and the detector 110 can exhibit approximate no movement (e.g., remaining in a fixed position with respect to the rotation axis T of the target 102 and/or each other) during CT inspection but can be moved for setup of a desired scan geometry prior to conducting CT inspection.

The system 100 can be configured to acquire measurements of intensity of the radiation beam 108 when the stage 106 is positioned at two or more measurement positions. As discussed in detail below, when an even number of measurement positions are employed, each of the measurement positions can have the rotation axis T of the stage 106 offset from the central axis A of the radiation beam 108. When an odd number of measurement positions are employed, one measurement position can have the rotation axis T of the stage 106 intersect the central axis A of the radiation beam 108 and the remaining measurement positions can have the rotation axis T of the stage 106 offset from the central axis A of the radiation beam 108.

FIG. 1A illustrates an exemplary operating environment including two measurement positions, a first position 120a and a second position 120b. In the first position 120a, the rotation axis T is offset from the central axis A of the radiation beam 108 by a distance $d_1$. In the second position 120b, the rotation axis T is offset from the central axis A of the radiation beam 108 by a distance $d_2$.

Embodiments of the first and second positions 120a, 120b can adopt a variety of configurations. In one aspect, the distances $d_1$ and $d_2$ can be approximately equal to one another or different from one another. In a further aspect, the first and second positions 120a, 120b can be approximately symmetric about the central axis A of the radiation beam 108. In general, CT volume images reconstructed from CT images acquired with symmetric configuration of the measurement positions can be computationally easier than non-symmetric configurations. However, non-symmetric configurations can also be employed.

In another aspect, the first and second positions 120a, 120b can be configured such that the magnification of the target 102 is approximately equal at each position. As an example, this condition can be satisfied when the distance between the target 102 and the detector 110 is approximately equal in each of the two or more positions. As an example, the distance between the target 102 and the detector 110 can be characterized by a line extending normal to the detector 110 that intersects the rotation axis T of the stage 106.

In a further aspect, the first and second positions 120a, 120b can be configured such that the rotation axis T of the stage 106 at each measurement position is within the radiation beam 108. So configured, the entirety of the target 102 will pass through the radiation beam 108 during one complete revolution. That is, the detector 110 can acquire intensity measurements for the entire target 102 within one revolution.

During operation of the system 100, translation and rotation can be performed separately. As an example, the stage 106 can be translated to the first position 120. Once the stage 106 is placed at the first position, the stage 106 can be subsequently rotated. In an embodiment, the stage 106 is only rotated by one complete revolution (e.g., 360°).

In certain embodiments, acquisition of intensity measurements can be performed by a rotational only scan (e.g., a circular scan), not by a helical scan. That is, from the perspective of the target 102, the radiation beam 108 traces a circular path, not a helical path. A rotational scan can be accomplished in either of two approaches. In a first approach, the radiation beam 108 is emitted during both translation and rotation of the stage 106 but the detector 110 is configured to acquire intensity measurements only during rotation of the stage 106, not during translation. In a second approach, the radiation beam 108 is emitted only during rotation of the stage 106, not during translation of the stage 106.

The memory of the controller 112 can store instructions for determining CT volume images, quantitative maps of material density or a related quantity at each location within the inspected cross-sections of the target 102. CT volume images can be determined for each of the first and second positions 120a, 120b based upon respective CT images (detection signals 110s) received from the detector 110 at the first and second positions 120a, 120b and knowledge of the emitted intensity of the radiation beam 108 (e.g., prior to transmission through the target 102).

The memory of the controller 112 can also store instructions related to reconstructing CT volume images of the target 102 according to one or more reconstruction techniques based upon the angle of rotation of the target and the corresponding detection signals (e.g., the CT images) received from the detector 110. Examples of reconstruction techniques can include iterative and analytical algorithms. Cross-sections can be analyzed separately and then combined to form the three-dimensional volume of the target or the cross-sections can be rebinned/combined into a rotary data set. In certain embodiments, such data sets can be incomplete in relation to the Tuy-Smith sufficiency condition. In particular, iterative algorithms can be configured to handle incomplete data sets. In alternative embodiments, not shown, the radiation detector can be configured to transmit the detection signals to a computing device different from the controller for reconstruction of the target cross-sections and/or target volume, as discussed above.

The CT images acquired at the first and second positions 120a, 120b can be combined. In one aspect, the CT images acquired at the first and second positions 120a, 120b can be combined by stitching the respective CT images together. That is, the CT images from positions 120a, 120b can be back projected in the same volume with respect to the real geometry of the target 102. In this approach, the different fan angles of the images are accounted for. In another aspect, CT volume images determined from CT images acquired at the first and second positions 120a, 120b can be combined by adding the two volumes voxel by voxel.

The controller 112, or the alternative computing device, can also be configured to transmit one or more output signals 122s including data characterizing one or more CT volume images to the output device 114. As an example, the controller 112 can output the material density or related quantity as a function of position. In certain embodiments, the output device can be a display and/or a data storage device. Rays of the radiation beam 108 transmitted through the target 102 at the different positions travel a different paths to the detector 110 and sample different portions of the target 102. As an example, using intensity measurements acquired at the first and second positions 120a, 120b can be thought as being similar to intensity measurements acquired simultaneously from two radiation beams 108 positioned at opposite sides of the target 102.

CT images acquired at the first and second positions 120a, 120b can be thought as being similar to CT images acquired simultaneously from two radiation beams 108 positioned at opposite sides of the target 102. The CT images at each position complement one another and include information not present in the other. As a result, the use of intensity measurements acquired from the two or more positions can reduce the occurrence of artifacts in CT volume images reconstructed therefrom.

Figure 1C:
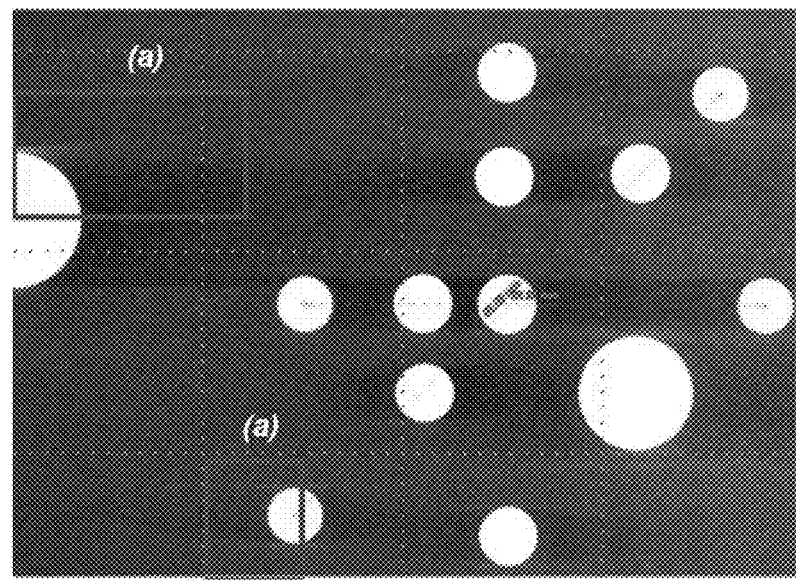
FIG. 1C is a CT volume image illustrating a cross-section of a target reconstructed from CT images acquired by the CT system of FIG. 1A.
Figure 1D:
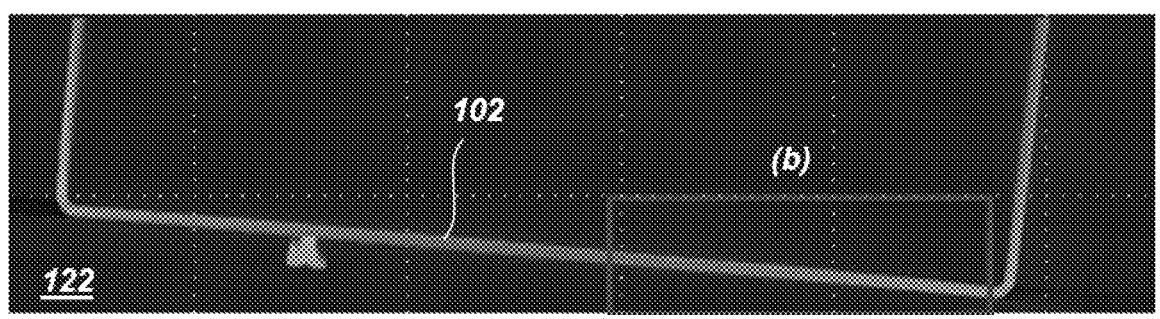
FIG. 1D is a CT volume image illustrating a cross-section of another target reconstructed from CT images acquired by the CT system of FIG. 1A.

These improvements can be seen in exemplary CT volume images of the target 102 acquired by the system 100, illustrated in FIGS. 1C-1D. FIG. 1C is a CT volume image illustrating a cross-sectional view of one target 102 (e.g., within the y-z plane) and FIG. 1D is a CT volume image illustrating a cross-sectional view (e.g., within the y-z plane) of another target 102. The relative absence of artifacts can be observed by little to no streaking in the highlighted boxes in the CT volume image of FIG. 1C and sharp contrast between edges of the target 102 and background 122 in FIG. 1D.

Figure 2A:
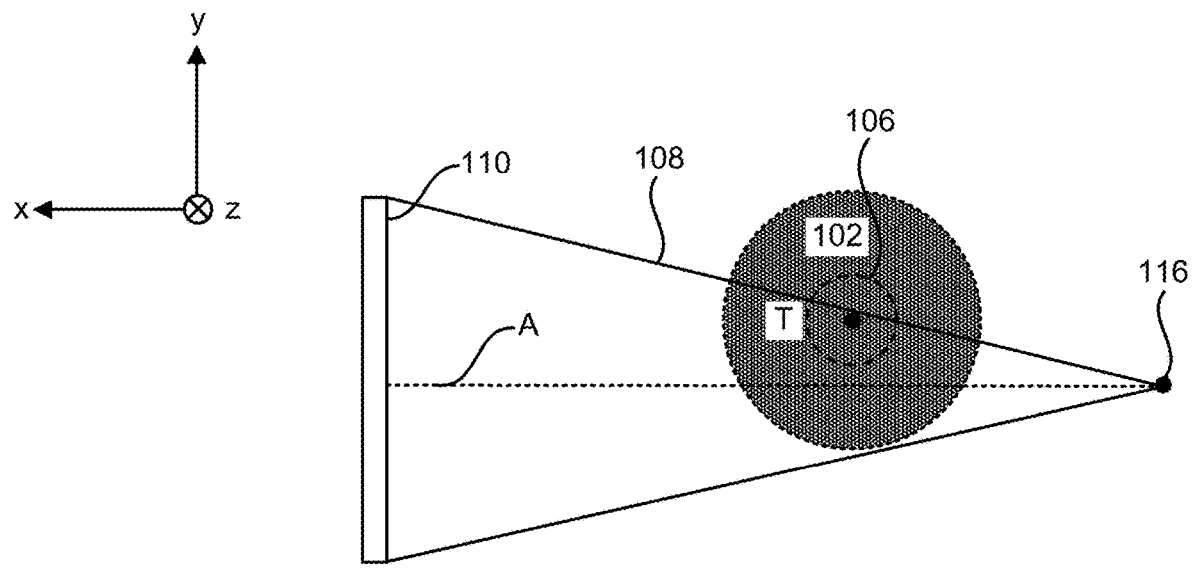
FIG. 2A is a diagram illustrating a first view of an operating environment including a CT system configured to perform an offset scan at a single position.
Figure 2B:
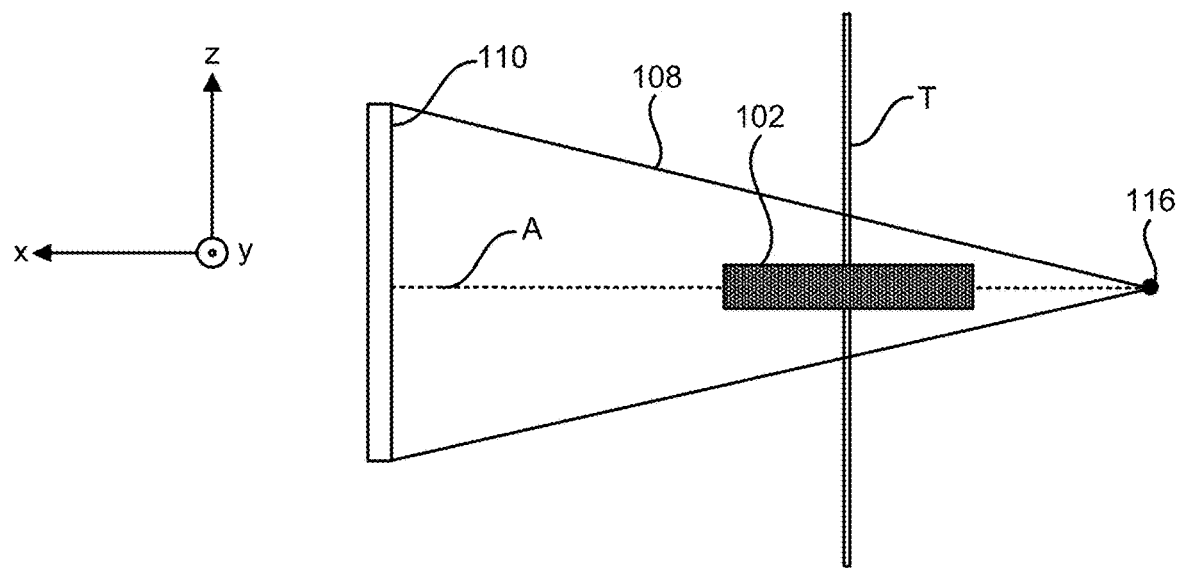
FIG. 2B is a diagram illustrating a side view of the operating environment of FIG. 2A including the target rotated by 180°.

By way of comparison, FIGS. 2A-2B illustrate an operating environment in which intensity measurements are acquired at a single position, rather than the two or more positions. FIG. 2A illustrates a view of the operating environment in the x-y plane. The radiation source 104, controller 112, and output device 114 are present but omitted from FIG. 2A.

Figure 2C:
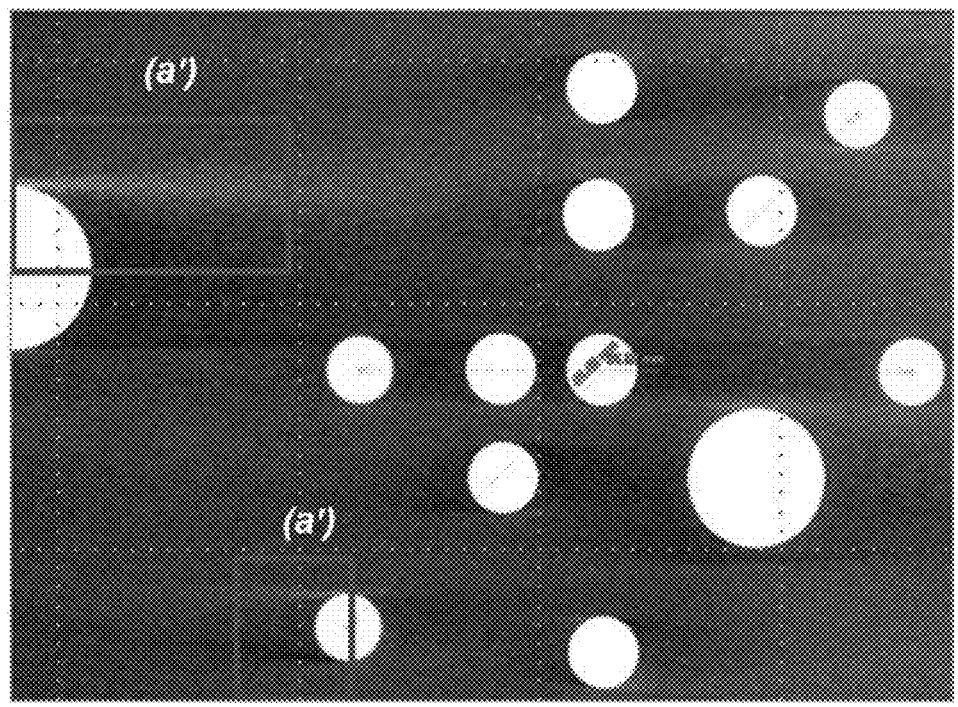
FIG. 2C is a CT volume image illustrating a cross-section of a target reconstructed from CT images acquired by CT system of FIG. 2A.
Figure 2D:
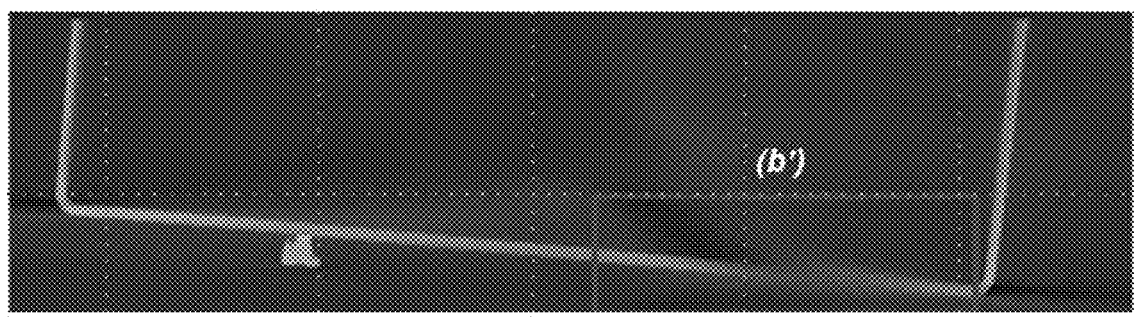
FIG. 2D is a CT volume image illustrating a cross-section of another target reconstructed from CT images acquired by the CT system of FIG. 2A.

Corresponding CT volume images of the target 102 acquired by the system of FIG. 2A are illustrated in FIGS. 2C-2D. FIG. 2C is a CT volume image illustrating a cross-sectional view of the same target 102 shown in FIG. 1C and FIG. 2D is a CT volume image illustrating a cross-sectional view of the same target 102 shown in FIG. 1D.

By comparing FIGS. 1C and 2C, as well as FIGS. 1D and 2D, it can be observed that the CT volume images generated from intensity measurements are acquired at a single position exhibit significantly more artifacts. Notably, white streaks present in FIG. 2C (boxes (a')) are absent in FIG. 1C (boxes (a)). Furthermore, an artifact in the form of an incomplete contour illustrated in the volume image of FIG. 2D (box (b') is absent from the corresponding volume image of FIG. 1D.

Figure 3A:
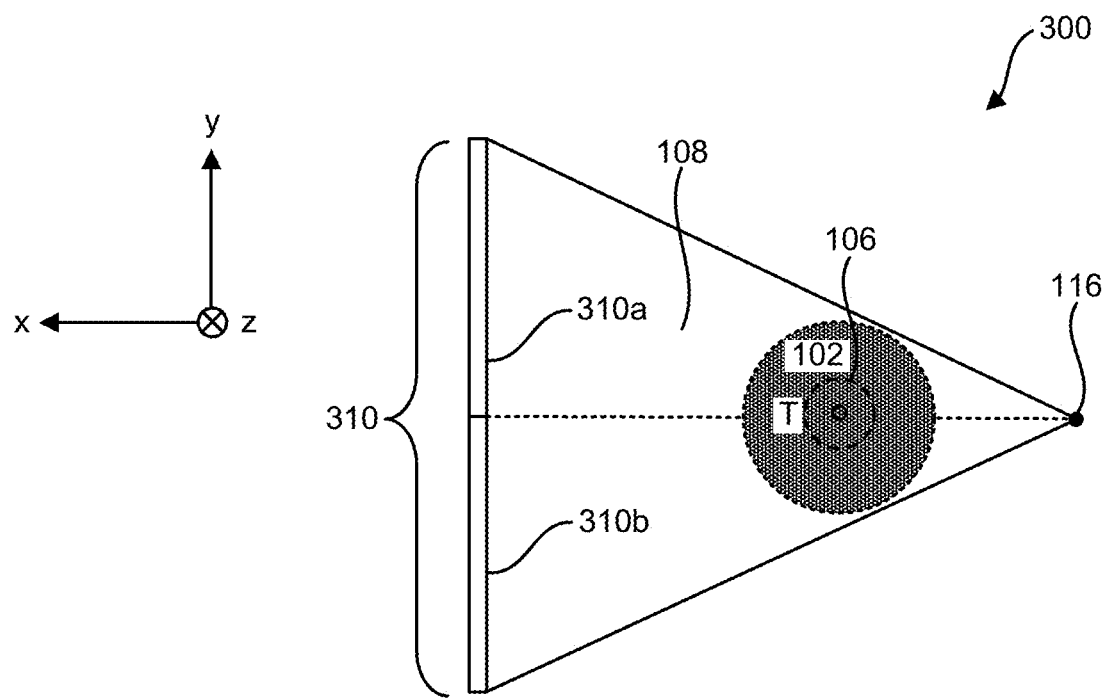
FIG. 3A is a diagram illustrating one exemplary embodiment of an operating environment including a computed tomography (CT) system including a 2× virtual detector.
Figure 3B:
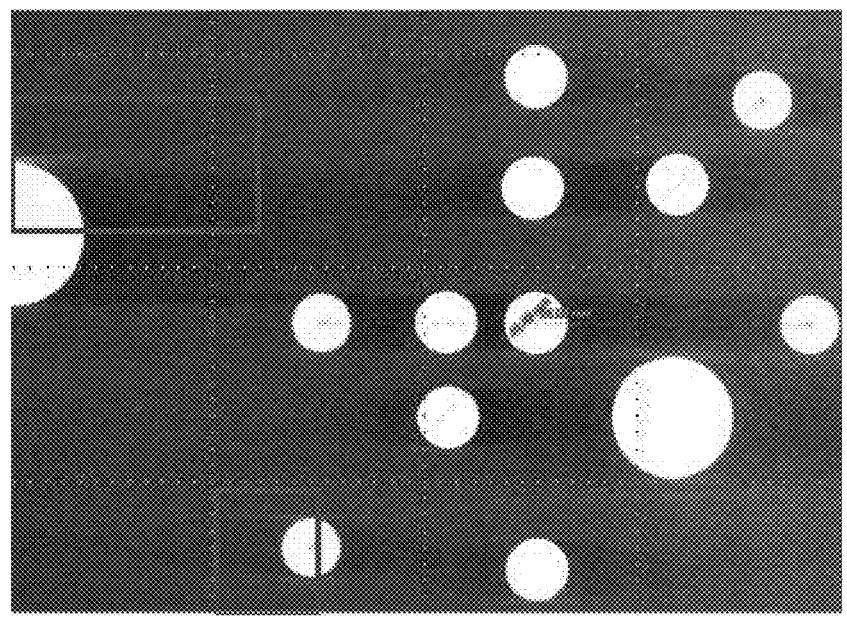
FIG. 3B is a CT volume image illustrating a cross-section of a target reconstructed from CT images acquired by the CT system of FIG. 3A.

A further comparison of the CT system 100 can be made to other CT systems employing virtual detectors. In general, a virtual detector can be a single detector that is movable from a first detection position to a second detection position to increase the effective detection area of a CT system. An exemplary CT system 300 including a detector 310 configured to move from a first detection position 310a to a second detection position 310b is illustrated in FIG. 3A. FIG. 3B is a CT volume image illustrating a cross-sectional view (e.g., within the y-z plane) of the same target 102 as FIGS. 1C and 2C.

By comparing FIGS. 3B, 1C, it can be observed that the CT system 300 generates CT volume images having a similar degree of artifact reduction. That is, the benefits of intensity measurements at different angles can be achieved in the CT system 300 due to movement of the detector 310, rather than movement of the target 102. However, it can be understood that the CT system 300 can be more expensive to purchase and operate due to the addition of mechanisms needed to move the detector 310. Furthermore, acquisition of intensity data by the CT system 300 is slower than that of CT system 100 due to the time required to move the detector 310 from the first detection position 310a to the second detection position 310b. Thus, even though the CT volume image quality can be comparable between CT systems 100 and 300, CT system 100 can be preferred over CT system 300 for cost and/or speed.

Embodiments of the CT system 100 can further perform intensity measurements in more than two measurement positions without limit. Employing existing systems, in order to acquire CT images from bigger samples or higher magnification, a larger physical or virtual detector can be required. However, according to embodiments of the present disclosure, the benefits of such larger detectors can be achieved by use of more measurement positions. As discussed above, the configuration of FIG. 1A can acquire CT images sufficient for reconstruction of CT volume images comparable to a 2× virtual detector. Similarly, use of three measurement positions can acquire CT images sufficient for reconstruction of CT volume images comparable to a 3× virtual detector.

Figure 4A:
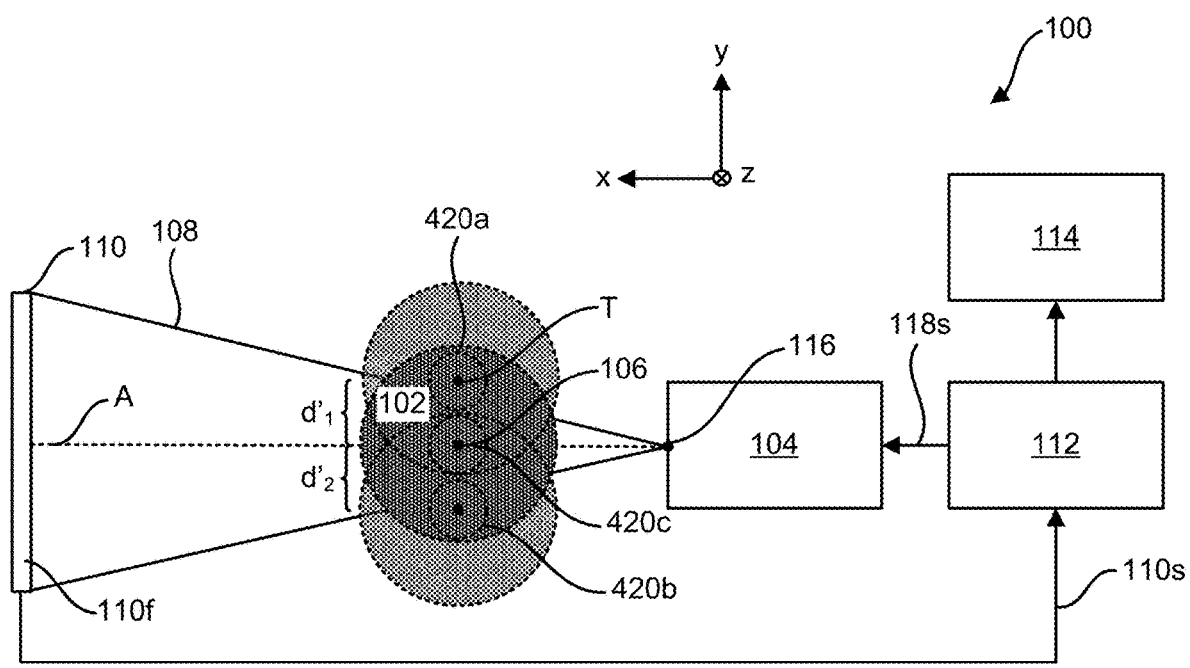
FIG. 4A is a diagram illustrating one exemplary embodiment of an operating environment including another embodiment of the computed tomography (CT) system of the presented disclosure configured to perform an offset scan at three positions.

FIG. 4A illustrates the CT system 100 with the stage 106 configured to translate the target 102 between three measurement positions, a first position 420a, a second position 420b, and a third position 420c. The third position 420c can be positioned between the first position 420a and the second position 420b. As shown, in the first position 420a, the rotation axis T is offset from the central axis A of the radiation beam 108 by a distance d'1. In the second position 420b, the rotation axis T is offset from the central axis A of the radiation beam 108 by a distance d'2. In the third position 420c, the rotation axis T can approximately intersect the central axis A.

Embodiments of the first and second positions 420a, 420b can adopt a variety of configurations. In one aspect, the distances d'1 and d'2 can be approximately equal to one another or different from one another. In a further aspect, the first and second positions 420a, 420b can be approximately symmetric about the central axis A of the radiation beam 108.

In another aspect, the first, second, and third positions 420a, 420b, 420c can be configured such that the magnification of the target 102 is approximately equal at each position. As discussed above this condition can be satisfied when the distance between a line normal to the detector 110 and the rotation axis T is approximately equal in each of the measurement positions.

In contrast to the two measurement configuration of FIG. 1A, when more than two measurement positions are employed, the requirement that the rotation axis T be positioned within the radiation beam 108 can be relaxed. As shown in FIG. 4A, the first, second, and third positions 420a, 420b, 420c can be configured such that the rotation axis T of the stage 106 is not within the radiation beam 108 for the first position 420a and the second position 420b. Such configurations are permissible, provided that the first, second and third positions 420a, 420b, 420c avoid gaps in transmission of the radiation beam 108 through the target 102.

Figure 4B:
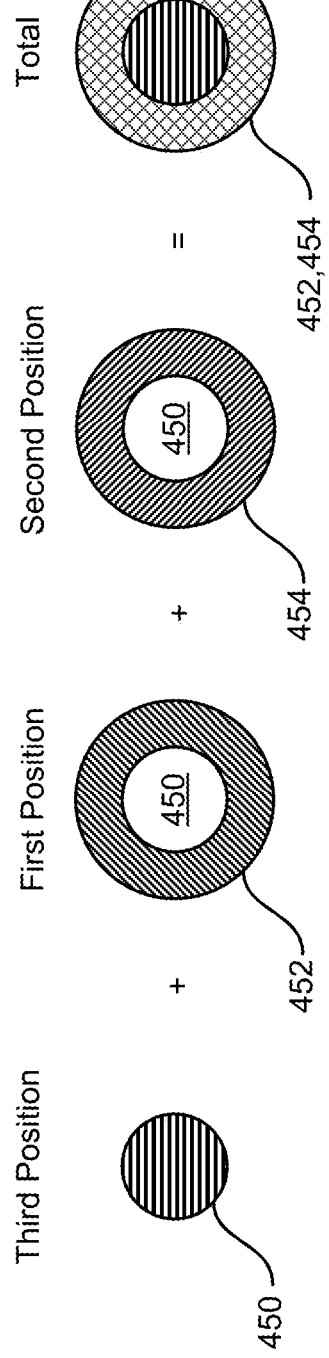
FIG. 4B is a diagram illustrating one exemplary embodiment of areas of the target intersecting the radiation beam in the CT system of FIG. 4A including three measurement positions.
Figure 4C:
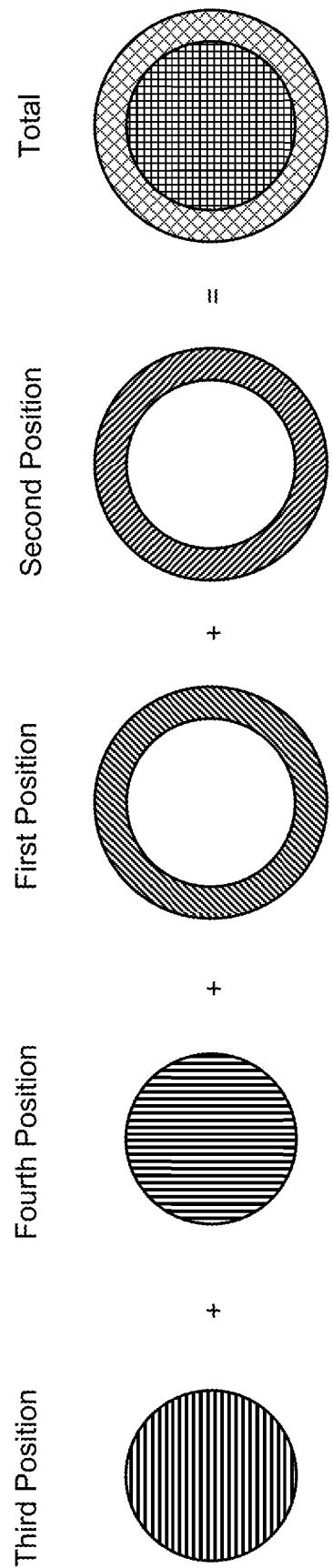
FIG. 4C is a diagram illustrating one exemplary embodiment of areas of the target intersecting the radiation beam in an embodiment of the CT system including four measurement positions.

FIG. 4B illustrates this requirement for three measurement positions. As shown, with the third position 420c having the rotation axis T intersecting the central axis A, a center area 450 of the target 102 intersects the radiation beam 108. With the first and second positions 420a, 420b having the rotation axis T positioned outside of the radiation beam 108, offset distances $d'_1$ and $d'_2$ can be selected that outer areas 452, 452 intersect the radiation beam 108. It can be observed that the sum of these areas provide full coverage of the target (Total). While not shown, there can also be overlap between the center area and the two outer areas.

4C illustrates this requirement for four measurement positions. Similar to the three position configuration, the first and second measurement positions can have the rotation axis T positioned outside of the radiation beam, and offset distances $d'_1$ and $d'_2$ can be selected that outer areas 452, 452 intersect the radiation beam 108. The sum of these areas can provide full coverage of the target (Total). While not shown, there can also be overlap between the center area and the two outer areas. Further configurations having five or more measurement positions can be similarly employed.

Embodiments of the CT system 100 can further provide a reduced footprint, as compared to CT systems employing virtual detectors. The footprint can be the minimum occupied space necessary to conduct CT inspection. In general, shop floors can be limited in space, and reduction of the footprint of a CT inspection system can facilitate deployment. Furthermore, with a smaller footprint, a housing of the CT system 100 can be designed smaller. Cost savings can also be realized because less lead is required to shield a smaller footprint of the CT system 100.

FIGS. 5A-5C compare footprints 500, 502 for the CT system 300 including the 2× virtual sensor 310 and the CT system 100 under conditions of maximum size of the target 102. The target 102 shown in FIGS. 5A-5B is the maximum size target 102 because the target 102 is as close to the virtual detector 310 or detector 110 as possible without contact. Because the horizontal dimension of the footprint of these two systems is the same (e.g., horizontally from the focal point to the 2× virtual detector 310 or detector 110), the respective footprints 500, 502 can be compared based upon the vertical dimension alone.

The footprint 500 of the CT system 300 extends in the vertical direction between opposite ends of the virtual sensor 310. The footprint 502 of the CT system 100 extends in the vertical direction between the opposed ends of the detector 110. It can be observed that, under conditions of maximum sample size, the footprint 502 of CT system 100 is modestly smaller than the footprint 500 of the CT system 300.

Figures 6A, 6B:
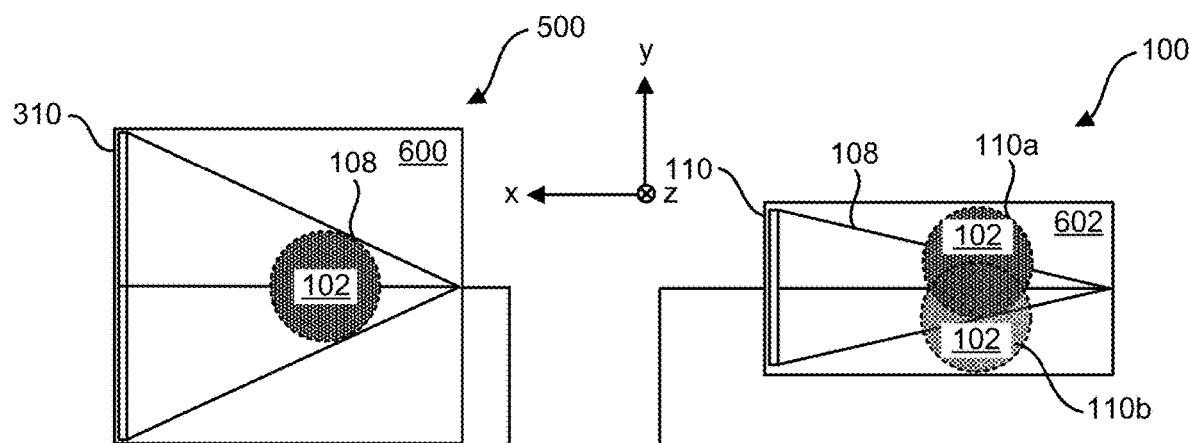
FIG. 6A is a diagram illustrating a footprint of the CT system of FIG. 3A with placement of the target for increased magnification as compared to FIG. 5A
FIG. 6B is a diagram illustrating a footprint of the CT system of FIG. 1A with placement of the target for increased magnification as compared to FIG. 5B.
Figure 6C:
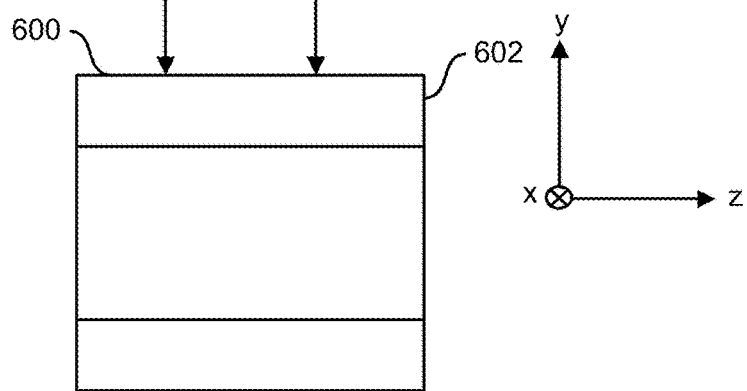
FIG. 6C is a diagram illustrating a comparison of the footprints of FIGS. 6A and 6B.

FIGS. 6A-6C compare footprints 600, 602 for the CT system 300 including the 2× virtual sensor 310 and the CT system 100 under conditions of higher magnification, where the target is moved closer to the radiation source as compared to FIGS. 5A-5C. Because the horizontal dimension of the footprint of these two systems is the same (e.g., horizontally from the focal point to the 2× virtual detector 310 or detector 110), the respective footprints 600, 602 can be compared based upon the vertical dimension alone. The target 102 shown in FIG. 6A is the maximum size target 102 for CT system 300 because the target 102 is distanced as far from the virtual detector 510 as possible while the entire cross-section of the target 102 is still within the radiation beam 108. The target 102 shown in FIG. 6B is the maximum size target 102 for CT system 100 at the same magnification as CT system 500.

The footprint 600 of the CT system 300 extends in the vertical direction between opposite ends of the virtual sensor 310. The footprint 602 of the CT system 100 extends in the vertical direction between the opposed ends of the detector 110. It can be observed that, under conditions of higher magnification, the footprint 602 of CT system 100 is significantly smaller than the footprint 600 of the CT system 300.

Figures 7A, 7B, 7C:
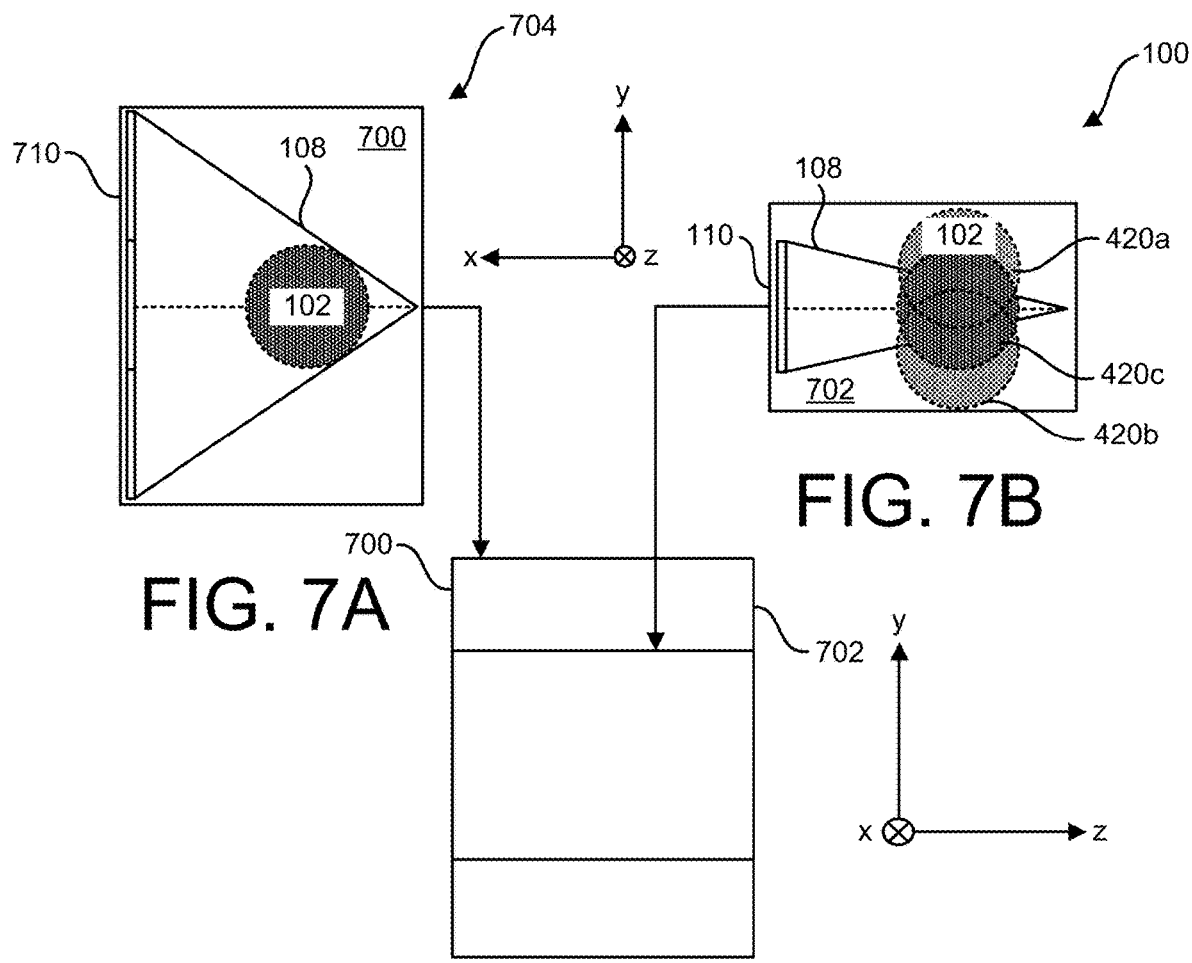
FIG. 7A is a diagram illustrating a footprint of a CT system including a 3× virtual detector with placement of the target for increased magnification as compared to FIG. 6B.
FIG. 7B is a diagram illustrating a footprint of the CT system of FIG. 4A with placement of the target for increased magnification as compared to FIG. 6B.
FIG. 7C is a diagram illustrating a comparison of the footprints of FIGS. 7A and 7B.

FIGS. 7A-7C compare footprints 700, 702 for a CT system 704 including a 3× virtual sensor 710 and the CT system 100 under conditions of three measurement positions. Because the horizontal dimension of the footprint of these two systems is the same (e.g., horizontally from the focal point to the 3× virtual detector 710 or detector 110), the respective footprints 700, 702 can be compared based upon the vertical dimension alone. The target 102 shown in FIG. 7A is the maximum size target 102 for CT system 704 because the target 102 is distanced as far from the virtual detector 710 as possible while the entire cross-section of the target 102 is still within the radiation beam 108. The target 102 shown in FIG. 7B is the maximum size target 102 for CT system 100 at the same magnification as CT system 700.

The footprint 700 of the CT system 704 extends in the vertical direction between opposite ends of the virtual sensor 710. The footprint 702 of the CT system 100 extends in the vertical direction between the opposed ends of the detector 110. It can be observed that, under conditions of maximum magnification, the footprint 702 of CT system 100 is significantly smaller than the footprint 600 of the CT system 300.

Embodiments of the CT system 100 can also be employed to calibrate the position of the rotation axis T. Currently, this position is estimated. However, without accurate knowledge of the position of the rotation axis T, generated CT images can include reconstruction errors rendering the CT volume images unsuitable for quantitative measurements of features of the target 102.

Figure 8E:
FIG. 8E is a diagram illustrating a CT volume image reconstructed from the CT system of FIG. 2A when the rotation axis T of the stage is incorrectly estimated.
Figure 8E:
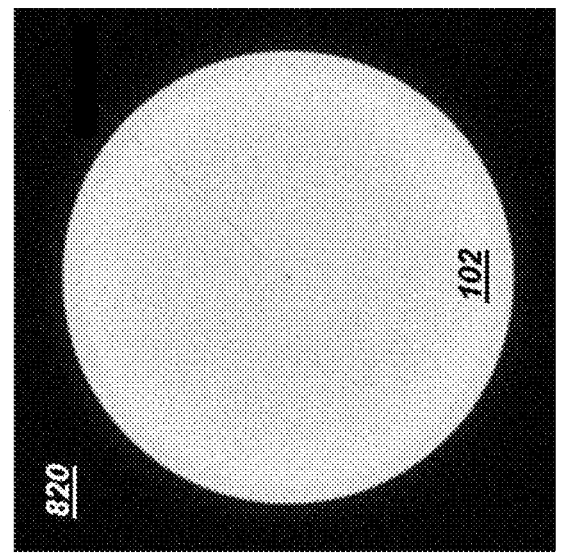
Figure 8C:
FIG. 8C is a diagram illustrating a CT volume image reconstructed from CT images acquired by the CT system of FIG. 1A when the rotation axis T of the stage is incorrectly estimated.
Figure 8C:
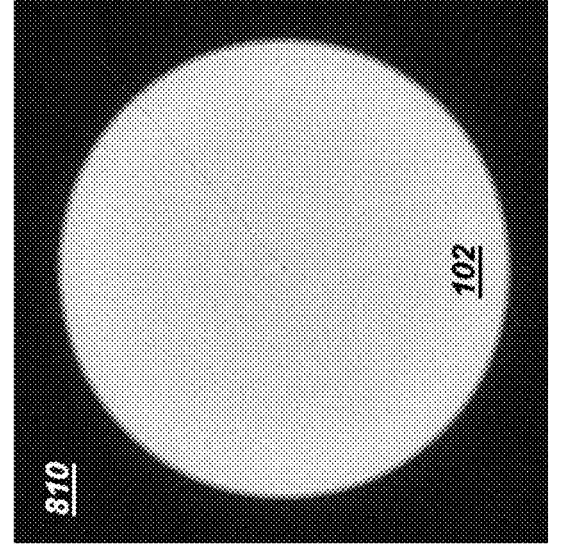
Figure 8A:
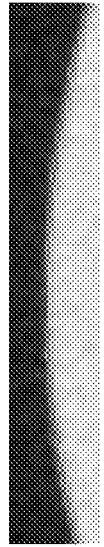
FIG. 8A is a diagram illustrating a CT volume image reconstructed from CT images acquired by the CT system of FIG. 1A when the rotation axis T of the stage is correctly estimated.
Figure 8A:
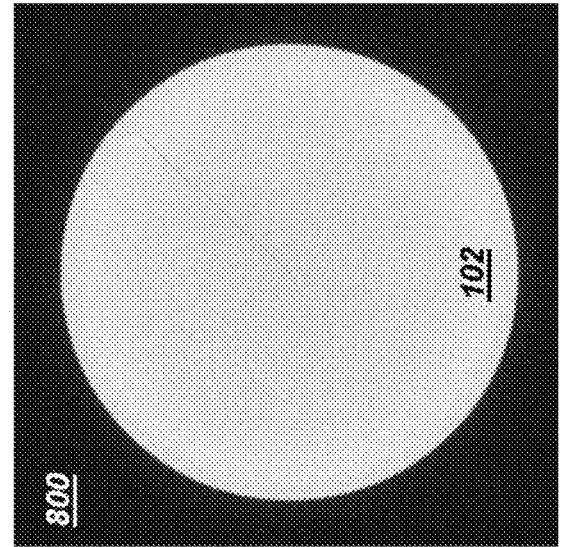

FIG. 8A illustrates a CT volume image 800 generated from intensity measurements acquired by the CT system 100 employing two measurement positions. The target 102 is a cylinder. FIG. 8B is a magnified view of an edge of the CT volume image 800. It can be observed that the edge in FIG. 8B is sharp. With proper calibration of the rotation axis T and this sharp edge, metrology, such as the radius of the target 102, can be easily performed.

FIG. 8C illustrates a CT volume image 810 generated from intensity measurements acquired by the CT system 100 employing two measurement positions. The target 102 is again a cylinder. FIG. 8D is a magnified view of an edge of the CT volume image 810. It can be observed that the edge in FIG. 8D is unsharp, indicating that the position of the rotation axis T is not correctly estimated. However, when the first and second positions 120a, 120b are approximately symmetric about the central axis T of the radiation beam 108, measurements acquired in the first position 120a introduce error that shifts the generated CT image by a certain amount in one direction and the measurements acquired in the second position 120b introduce error that shifts the generated CT image by approximately the same amount in the same direction. If the position of the rotation axis T had been correctly estimated, the edge would lie approximately equidistant between the two shifted edges. Thus, averaging these two shifts allows characterization of the error in the position of the rotation axis T, facilitating the correct calibration of the position of the rotation axis T and recovery of the CT image 800.

FIG. 8E illustrates a CT image 820 generated from intensity measurements acquired by the CT system 300 employing a single offset measurement position. The target 102 is again a cylinder. FIG. 8F is a magnified view of an edge of the CT image 820. While the edge in FIG. 8F is sharp, the position of the rotation axis T is not correctly estimated. As an example, the correct value is 12.55 mm but the estimated value is 12.42, an error of approximately 1%. This error in the generated CT image 820 results from a shift of the reconstructed CT volume image 820 from the "correct" position of FIG. 8A only in one direction. A shift of the CT image 810 in only one direction does not allow characterization of the error in the position of the rotation axis T or recovery of the CT image 800 as in the reconstructed CT volume image 810.

Figure 9:
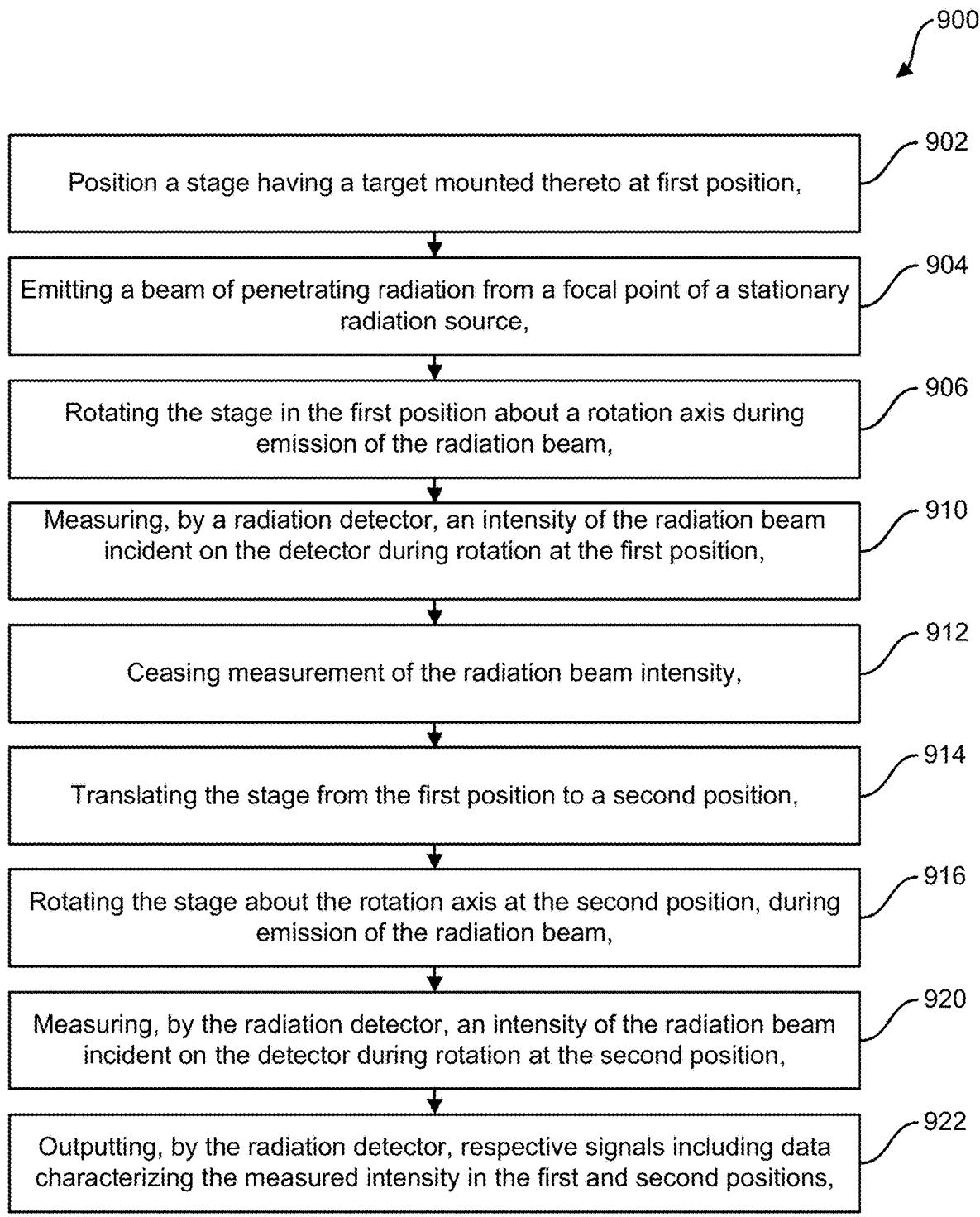
FIG. 9 is a flow diagram illustrating one embodiment of a method for inspection of a target by computed tomography.

FIG. 9 is a flow diagram illustrating one exemplary embodiment of a method 900 for inspection of a target by computed tomography. As shown, the method includes operations 902-922. Embodiments of the method 900 are discussed below in the context of FIGS. 1A and 4A. It can be understood that alternative embodiments of the method can include greater or fewer operations than illustrated in FIG. 9 and the operations can be performed in a different order than illustrated in FIG. 9.

In operation 902, the stage 106 having the target 102 mounted thereto is positioned at the first position 120a.

In operation 904, the beam of penetrating radiation 108 is emitted from the focal point 116 of the stationary radiation source 104. The radiation beam can extend from the focal point 116, through a portion of the target 106, and be incident upon the sensing face 110ƒ of the stationary radiation detector 110.

In operation 906, the stage 106 is rotated about the rotation axis T during emission of the radiation beam 108.

In operation 910, an intensity of the radiation beam 108 transmitted through the target 106 during rotation at the first position 120*a* and incident upon the sensing face 110ƒ of the stationary radiation detector 110 is measured as a function of position.

In operation 912, measurement of the intensity of the radiation beam 108 by the stationary radiation detector 110 ceases.

In operation 914, while measurement of the intensity of the radiation beam 108 ceases, the stage 106 can be moved from the first position 120*a* to a second position 120*b* along a translation path transverse to the central axis A of the radiation beam 108.

In operation 916, the stage 106 at the second position 120*b* is rotated about the rotation axis T during emission of the radiation beam.

In operation 920, an intensity of the radiation beam 108 transmitted through the target 106 during rotation at the second position 120*b* and incident upon the sensing face 110ƒ of the stationary radiation detector 110 is measured as a function of position.

In operation 922, respective signals including data characterizing the measured intensity of the radiation beam 108 (e.g., detection signals 110*s*) can be output by the stationary radiation detector 104.

Exemplary technical effects of the methods, systems, and devices described herein include, by way of non-limiting example, reduction of artifacts in CT images. The disclosed embodiments can provide CT systems having smaller footprints as compared to existing CT systems. The disclosed embodiments can further facilitate calibration of the rotation axis T of the CT system, which can facilitate metrology such as dimensional measurements of a target (e.g., radius). While the embodiments discussed above have been in the context of rotational only scans (e.g., circular) scans, it can be understood that the above-discussed metrology benefits can also be obtained when employing helical scans.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. A system, comprising:
   a stage configured to secure a target thereon and to rotate about a rotation axis;
   a stationary radiation source configured to emit a beam of penetrating radiation from a focal point and directed upon the target, wherein the beam is emitted with a three-dimensional shape of an oblique cone;
   a controller, having computer readable instructions stored thereon, and configured to control the stage to translate from a first position to a second position in a direction transverse to a central axis of the radiation beam, wherein a magnification of the target at the first position and the second position is approximately equal;
   a stationary radiation detector including a sensing face configured to acquire measurements of an intensity of the radiation beam incident thereon as a function of position during a single revolution of the stage at the first position and configured to acquire measurements of an intensity of the radiation beam incident thereon as a function of position during a single revolution of the stage during a single revolution of the stage at the second position, the stationary radiation detector further configured to transmit data characterizing the intensity of the radiation beam measured at the first position and the second position to the controller, wherein the stationary radiation detector includes photostimulatable phosphor plates; and
   an output device, communicatively coupled to the stationary radiation detector, wherein the controller is further configured to
      generate a first volume image of the target from the data characterizing the intensity of the radiation beam measured at the first position, the first volume image composed of a first set of voxels;
      generate a second volume image of the target from the data characterizing the intensity of the radiation beam measured at the second position, the second volume image composed of a second set of voxels;
      register the first volume image and the second volume image with respect to a pre-determined geometry of the target;
      generate a combined volume image based on the registered first volume image and second volume image with respect to a pre-determined geometry of the target by adding together the first set of voxels and the second set of voxels, voxel by voxel; and
      provide the combined volume image to the output device.

2. The system of claim 1, wherein the rotation axis is positioned within the radiation beam at the first and second positions.

3. The system of claim 1, wherein the first and second positions are approximately symmetric about the central axis of the radiation beam.

4. The system of claim 1, wherein the stage is further configured to translate the target to a third position located between the first and second positions, wherein the magnification of the target in the first, second, and third positions is approximately equal.

5. The system of claim 4, wherein the rotation axis approximately intersects the central axis of the radiation beam in the third position.

6. The system of claim 4, wherein the position of the rotation axis in the third position is approximately equidistant between the position of the rotation axis in the first position and the position of the rotation axis in the second position.

7. The system of claim 1, wherein the radiation beam is not a parallel beam.

8. A method, comprising:
   positioning a stage having a target mounted thereto at a first position;
   emitting, from a focal point of a stationary radiation source, a beam of penetrating radiation, wherein the radiation beam extends from the focal point, through a portion of a target, and is incident upon a sensing face of a stationary radiation detector, wherein the beam is emitted with a three-dimensional shape of an oblique cone;

rotating the stage at the first position about a rotation axis during emission of the radiation beam;

measuring, by the stationary radiation detector, intensity of the radiation beam incident thereon as a function of position during a single revolution of the stage at the first position, wherein the stationary radiation detector includes photostimulatable phosphor plates; ceasing measurement of the intensity of the radiation beam;

transmitting, by the stationary radiation detector, data characterizing the intensity of the radiation beam measured at the first position, to a controller having computer readable instructions stored thereon;

translating the stage from the first position to a second position along a translation path transverse to a central axis of the radiation beam;

rotating the stage at the second position about the rotation axis during emission of the radiation beam;

measuring, by the stationary radiation detector, intensity of the radiation beam incident thereon as a function of position during rotation of the stage in the second position;

transmitting, by the stationary radiation detector, data characterizing the intensity of the radiation beam measured at the second position, to a controller having computer readable instructions stored thereon;

registering, by the controller, data characterizing the intensity of the radiation beam measured at the first position with data characterizing the intensity of the radiation beam measured at the second position, the registering further comprising generating, by the controller, from data characterizing the intensity of the radiation beam measured at the first position, a first volume image of the target, the first volume image composed of a first set of voxels;

generating, by the controller, from data characterizing the intensity of the radiation beam measured at the second position, a second volume image of the target, the second volume image composed of a second set of voxels; and registering the first volume image and the second volume image with respect to a pre-determined geometry of the target;

generating a combined volume image based on the registered first volume image and second volume image with respect to a pre-determined geometry of the target by adding together the first set of voxels and the second set of voxels, voxel by voxel; and providing the combined volume image to an output device communicatively coupled to the stationary radiation detector.

9. The method of claim 8, wherein the rotation axis is positioned within the radiation beam at the first and second positions.

10. The method of claim 8, wherein the first and second positions are approximately symmetric about the central axis of the radiation beam.

11. The method of claim 8, further comprising translating, by the stage, the stage to a third position located between the first and second positions, wherein the magnification of the target in the first, second, and third positions is approximately equal.

12. The method of claim 11, wherein the rotation axis approximately intersects the central axis of the radiation beam in the third position.

13. The method of claim 11, wherein the position of the rotation axis in the third position is approximately equidistant between the position of the rotation axis in the first position and the position of the rotation axis in the second position.

14. The method of claim 8, wherein the stage is not translated during emission of the first or second radiation beam.

15. The method of claim 8, further comprising calibrating the stage prior to measurement of the intensity of the radiation beam.

16. The method of claim 15, wherein the calibration determines the location of the rotation axis with respect to the radiation detector and the stationary radiation source.

17. The method of claim 15, further comprising measuring at least one dimensional measurement of the target based upon the data characterizing the intensity of the radiation beam measured at the first and second positions.

18. The method of claim 17, wherein the dimensional measurement is acquired from the first volume image and/or the second volume image constructed from the data characterizing the intensity of the radiation beam measured at the first and second positions.

* * * * *